March 16, 1971  C. G. MOLLER ET AL  3,570,155
SEQUENTIAL CARD DISPLAY

Filed Jan. 30, 1969  7 Sheets-Sheet 1

INVENTORS
RICHARD P. SCHOLFIELD
CARL MOLLER

BY Cushman Darby & Cushman
ATTORNEYS

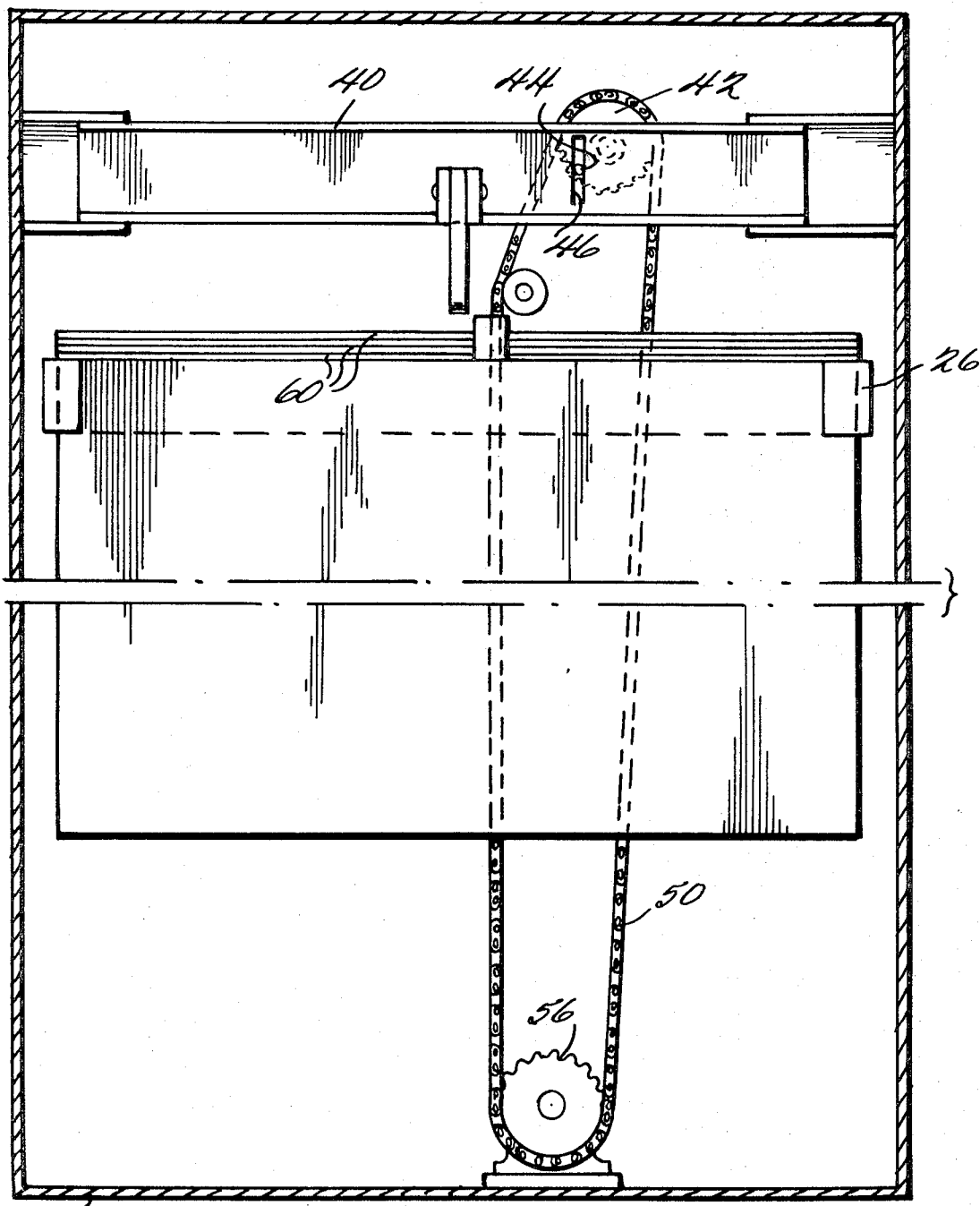

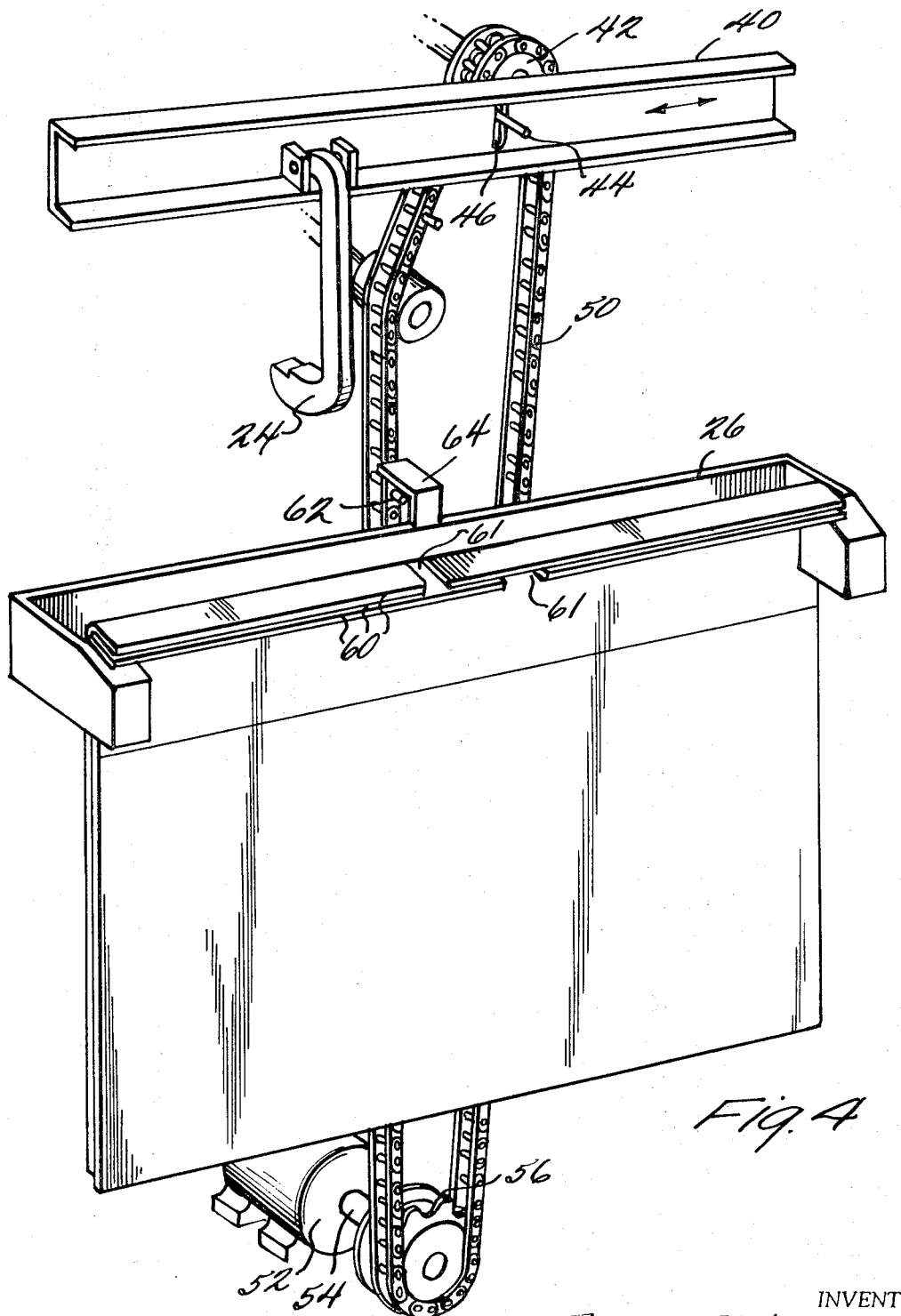

March 16, 1971    C. G. MOLLER ET AL    3,570,155
SEQUENTIAL CARD DISPLAY
Filed Jan. 30, 1969    7 Sheets-Sheet 4

INVENTORS
RICHARD P. SCHOLFIELD
CARL MOLLER
BY Cushman, Darby & Cushman
ATTORNEYS

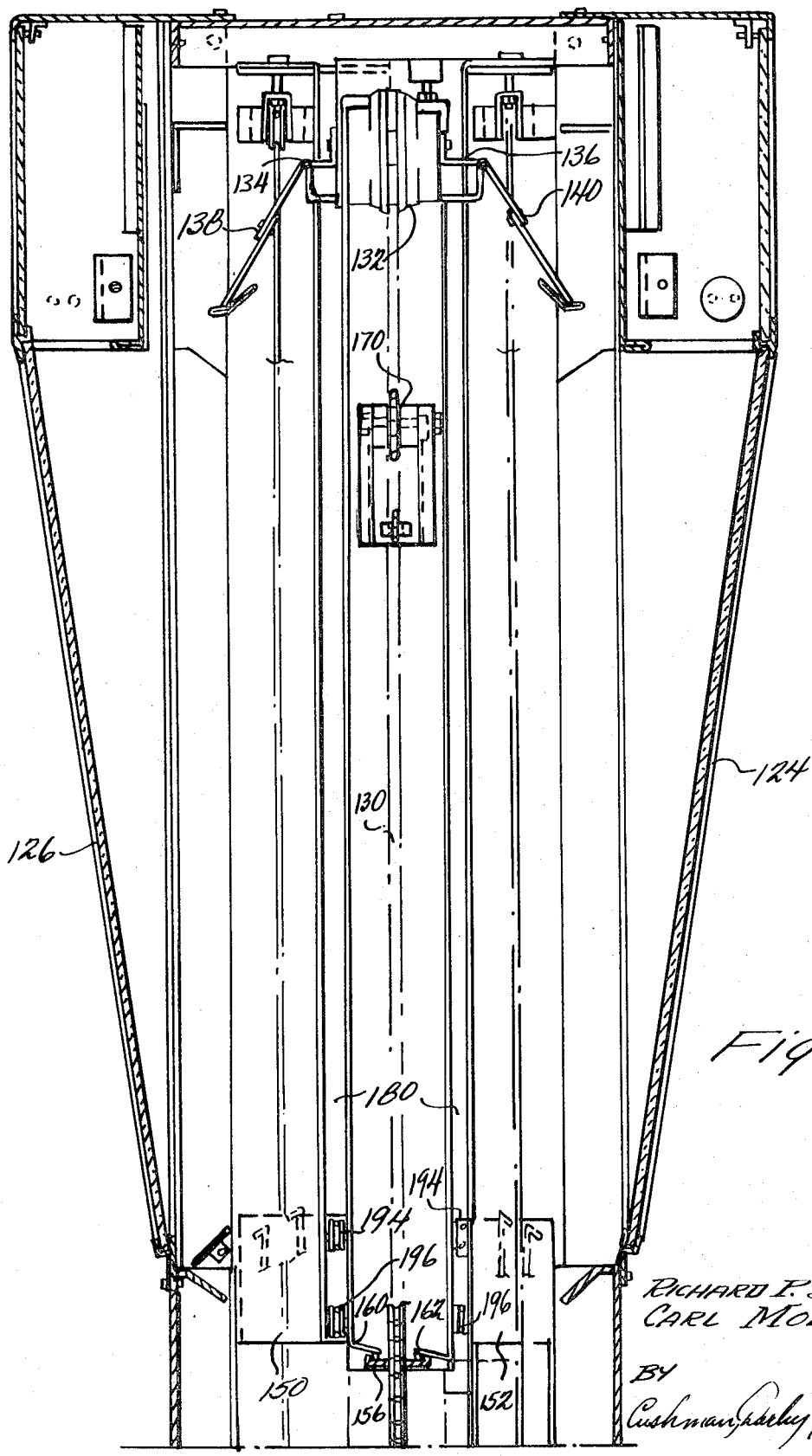

INVENTOR
RICHARD P. SCHOLFIELD
CARL G. MOLLER
BY
Cushman, Darby & Cushman
ATTORNEYS 3,570,155
SEQUENTIAL CARD DISPLAY
Carl G. Moller, New York, and Richard P. Scholfield, Armonk, N.Y., assignors to R. P. Scholfield Enterprises, Inc., Armonk, N.Y.
Filed Jan. 30, 1969, Ser. No. 795,275
Int. Cl. G09f 11/06, 11/30
U.S. Cl. 40—103
19 Claims

ABSTRACT OF THE DISCLOSURE

A device for sequentially displaying each of a series of display or show cards making up a complete program and for automatically repeating that program. The show cards are each supported from a dog or pivoted hook by a slotted hook stacked atop the hook of the next outermost card and the outermost card is dropped from view at spaced time intervals as the dog moves laterally and encounters the slot within the hook supporting the outermost card. After all the cards have fallen onto a lifting mechanism, they are returned together to their initial position hanging from the pivoted dog by the movement of an endless belt which also moves the dog laterally and the cycle is repeated. Both floor and counter models can be constructed and in one embodiment two sets of cards are sequentially displayed at the same time, each through a window on opposite sides of the device. In this embodiment a single means for moving the dog and lifting the cards is employed. Further, the cards may be disposed in transparent envelopes and more than one dog can be used to support a set of cards.

BRIEF DESCRIPTION OF THE PRIOR ART AND SUMMARY OF THE INVENTION

This invention relates to display apparatus and more particularly to apparatus for sequentially displaying a series of display cards or panels.

In displaying printed material, particularly for advertising, it is desirable for the display to change its appearance constantly or periodically to present a great quantity of changing visual material in a small space and thereby provide a feeling of vitality and action. In addition, it is often necessary to be able to present a large quantity of visual information in limited space. To accomplish both these goals an apparatus must provide for more display area than can be viewed at one time and store the display area not actually being viewed at any given instant. This storage problem can be solved easily by projecting images from a film onto a screen, but such an image is not always satisfactory, particularly in well lit environments, and may lack the visual impact attainable with printed material.

Many display devices have been utilized to present a changing display by, for example, sequentially displaying a series of printed cards or panels. One example of such a display is a series of triangularly-shaped display elements mounted with their axes in parallel relation so that by rotating each one third of a revolution, three distinct displays can be presented within a given space. Other apparatus have mounted the cards on an endless belt or similar structure and then rotated the belt to endless display the panels.

Other devices in the prior art have passed the cards from one storage area to another via a viewing area through which they may slowly pass or be held within for a predetermined time. However, in contrast to endless displays the cards must be returned to the first storage area, either continuously or at the end of a complete program, if the apparatus is to continue displaying cards in a series of repeated programs.

Many such devices have stacked the cards one behind the other in front of the viewing area and then periodically dropped the outermost by gravity into a storage area. The cards are then lifted from the storage area to the initial position either individually or en masse and the cycle repeated. For example, the Swank patent, 2,707,345, shows one such apparatus wherein the cards are returned individually.

The present invention as described below discloses a sequential display apparatus of this type whereby the displayed outermost card of a program is periodically dropped from a viewing position and the dropped cards are subsequently returned together to the initial position after all have been dropped and which is simple, effective and inexpensive. Further, the embodiment described below employs a reciprocating, pivoted dog or dogs upon which the cards hang by hooks which are stacked, each atop the next outermost, in combination with an endless driven belt or chain, whose motion causes the dog to move laterally and to periodically drop the outermost card when the position of the dog coincides with the position of a slot in the hook of that outermost card, and then causes all of the dropped cards to return to the initial position together, thereby repeatedly presenting a program made up of a number of display cards. For larger cards it may be desirable to use more than one dog, so that the cards are adequately supported, with, of course, corresponding slots for each dog in the cards.

Furthermore, in the embodiment described below, each of the cards is suspended from its slotted hook and stacked atop the outermost hook before a viewing window for a given time while the reciprocating dog which supports it moves laterally along the hook supporting the outermost card until the dog aligns itself with the slot in that hook, thereby allowing the outermost card being displayed to fall past the viewing window so that the next outermost card, whose hook has a slot out of alignment with the slot on the falling card, is displayed. This card is then display until the laterally moving dog lines up with the slot in its hook, which is supporting what is now the outermost card, so that it too falls past the window exposing the next card or panel. The cards may have hooks attached or simply be held within a transparent envelope having a suitable hook attached to the top. This periodic dropping of the outermost card continues until all of the cards have fallen onto a lifting mechanism below the view of the window where they are suspended and stored as their hooks are stacked atop the first card to be displayed and to drop in the program.

After all cards, or all but the last card, have fallen and all have been displayed, a pin or hook mounted on an endless belt whose endless motion has caused the lateral movement of the dog, is positioned so as to catch a protruding member of the lifting mechanism and elevate the mechanism and all of the cards, thereby, past the pivoted dog. The lifting mechanism is then disengaged from the hook or pin which has elevated it by lateral movement of the pin resulting from the belt's movement around a guide reel or cam, thereby allowing the lifting mechanism to fall back past the window to its initial position, and the cards to remain suspended by their stacked hooks from the dog as initially. The lifting mechanism may be permitted to fall freely or a braking arrangement such as a cord connected to a fixed spring and disposed with relation to the lifting mechanism so that as the mechanism falls the spring is stretched and brakes the mechanism, may be used. After returning to its initial position, the lifting mechanism once again catches the cards or panels by their hooks after they fall individually past the window until the rotation of the belt brings the pin mounted on the belt back into position to lift the mechanism along with the cards stored on it past the viewing window for deposition on the dog and, then to allow the mechanism to fall back to its initial position below the window.

In one embodiment of the invention, which is preferably a floor model, two sets of cards are sequentially displayed at the same time, each through a window on one side of the device. Further this dual viewing arrangement is preferably operated by one endless belt which cause the dog or dogs holding each set of cards to laterally move along each set of cards. Similarly, each of the sets of cards preferably falls onto a separate lifting mechanism and both lifting mechanisms are elevated by the endless moving belt and then allowed to fall so that the sets of cards are caught on the dogs.

Other purposes and objects of the invention will become clear after reading the following detailed description of the drawings.

BRIEF DESCRIPTION OF THE DRAWINGS

FIG. 3 shows a front view of the apparatus lifting the cards past the window;

FIG. 4 shows a perspective view, with the cover removed, of the apparatus while lifting the cards past the window;

FIG. 5 shows a view of the slotted hooks which support the display cards;

FIG. 9a shows a cut away side view of the top portion of another embodiment with two sets of cards which are displayed simultaneously;

FIG. 9b shows the lower portion of the embodiment of FIG. 9a;

FIG. 10 shows the braking arrangement for the embodiment of FIGS. 9a and 9b; and FIG. 11 shows a dual dog or hook arrangement.

DETAILED DESCRIPTIONS OF THE DRAWINGS

Figures 1, 2:
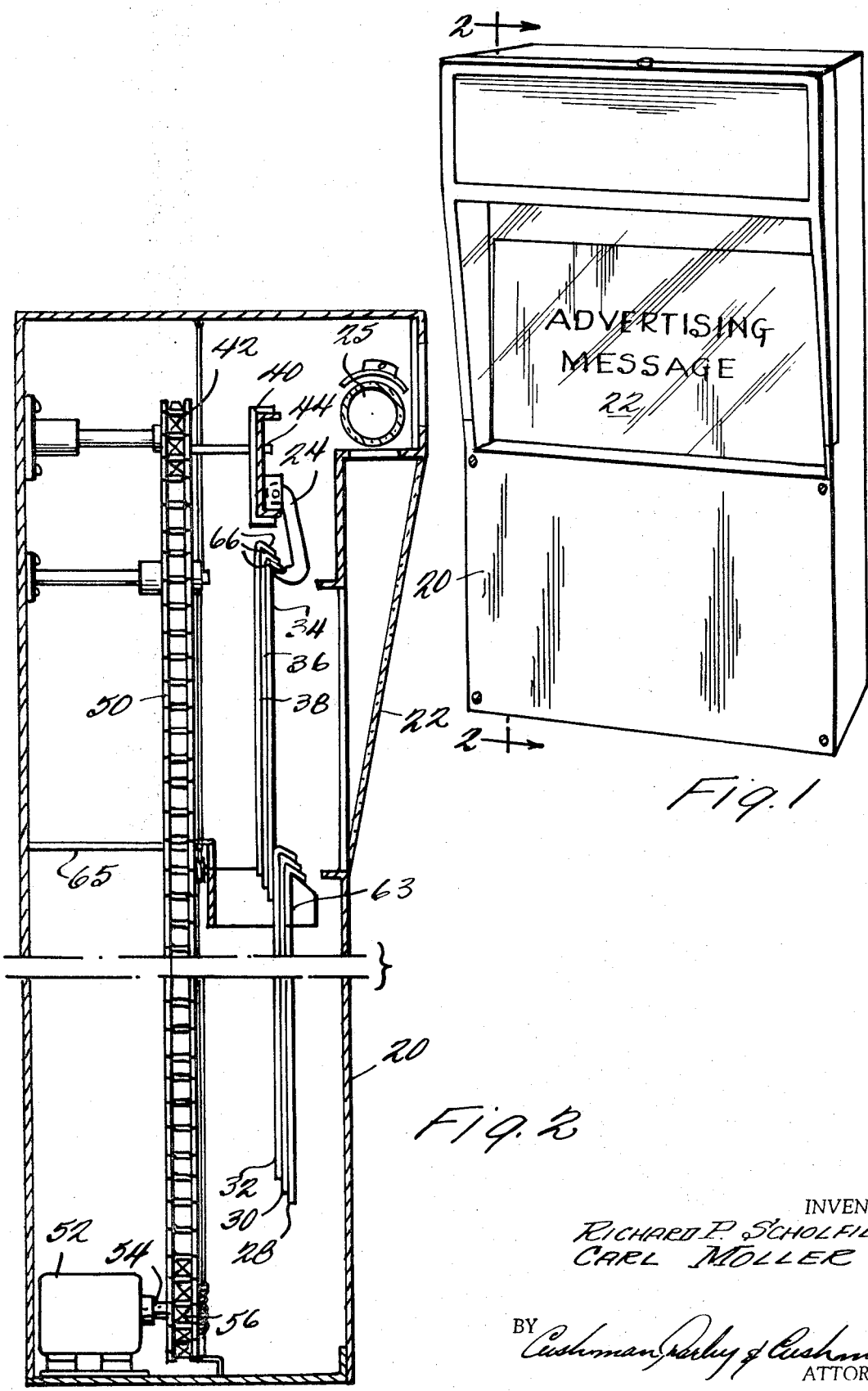
FIG. 1 shows an exterior view of the displaying apparatus.
FIG. 2 shows a cut away, side view of the apparatus shown in FIG. 1 along the line 2—2.

Reference is now made to FIG. 1 which shows an exterior view of one embodiment of the invention. A housing 20 which may be constructed out of any suitable material such as polished wood, metal or the like serves to enclose the mechanical elements and may be made in any shape which is suitable to contain the elements which must be lodged within it and which is pleasing to the eye. The window 22 which is situated at about eye level within the central area of the housing 20, serves to sequentially expose for viewing each of the show cards, such as card 34, which make up a complete program.

Although the embodiment shown in FIG. 1 is sized for display upon a table, pedestal or the like, the housing may be of any suitable size and the apparatus designed to display cards of any given size. Accordingly, the invention may also rest upon the floor and extend upward to any desirable height with windows disposed at desirable locations. However, the basic principle of the invention is readily understandable from the description of the operation of the embodiment shown in FIG. 1, as set forth below.

Basically, the device sequentially displays a series of advertising or show cards by supporting all of the show cards from a pivoted hook or dog 24, so that the outermost card is visible in the window 22 from the exterior. At regular intervals, the dog or hook 24 drops the outermost card, which is being displayed, past the window 22 into a temporary storage position below the window 22 so that the next outermost card is exposed for viewing. After the entire batch of cards has been so displayed and dropped, all of them are returned together to the original position and then the entire program repeated. The apparatus then displays each of a number of cards making up a program sequentially for a given amount of time and then repeats the program as long as the device is operating.

Reference is now made to FIGS. 2, 3 and 4 which show the elements which serve to cause the device to periodically drop the outermost card and to repeat the program. At the initiation of the program, all of the show cards are suspended from the pivoted hook or dog 24 and the outermost one is viewable through the window 22.

As shown in FIG. 2 the window 22 is preferably disposed at an angle, leaning slightly outward toward the viewer so as to minimize glare and reflection which may interfere with the visual communication or discourage the viewer. A source of light 25 which preferably is a fluorescent light is mounted above the window 22 but hidden from the viewer so that the cards are illuminated and stand out without shining a bright light directly in the eyes of the viewer.

As the program progresses, the cards fall past the window 22 at given intervals and are temporarily stored on the lifting mechanism 26. As shown in FIG. 2, three of the show cards 28, 30 and 32 have already been displayed and have then fallen past the window 22 onto the lifting mechanism 26. Three show cards 34 and 36 and 38 remain suspended from the pivoted hook or dog 24 and the show card 34 is currently being viewed through the window 22. Although six cards make up the program in FIG. 2, no limitation as to any particular number of cards is required nor intended, and, as discussed below, the maximum number of cards which can be used to make up a program with any particular device is related to the length of the belt which drives the device and the number of teeth and the size of the sprocket wheel. Programs of twelve cards have proved satisfactory.

The hook or dog 24 is mounted within a channel member 40 so as to be free to pivot about an axis parallel to the direction of movement of the channel 40, and to be constrained from moving about the other axes. Therefore, as the channel member 40 moves laterally, the hook 24 necessarily follows it in a back and forth, lateral fashion.

This lateral back and forth movement of the channel member 40 is caused by the circular movement of the pin 44 in a slot 46 in the channel member 40, the horizontal components of that movement causing the pin 44 to exert a force on the sides of the slot 46 resulting in the lateral back and forth motion of the pin 44. The pin 44 is attached to the sprocket wheel 42 at a given radius so that as the sprocket wheel 42 rotates, the pin follows, moving up and down in the slot 46 and pushing the channel 40 and the hook or dog 24 along with it from side to side. Of course, the time required to complete one rotation, and hence one back and forth cycle, of the channel member 40 is the same regardless of the radius at which the pin 44 is mounted, the radius only affecting the speed and distance which the channel member 40 moves.

The sprocket 42 is, in turn, driven through a belt or chain 50 by a motor 52 which drives the belt 50 through a shaft 54 and a driven wheel 56. The belt 50 may be of any suitable material but for this embodiment a sprocket chain is preferred. Any suitable electrical motor can be employed. As discussed in detail below, it is necessary that at the end of a complete cycle, any given point on the belt 50 is returned to its position at the beginning of the cycle. With a sprocket chain this requirement is satisfied if the length of the chain expressed in pitches is a multiple of the number of teeth on the sprocket wheel 42.

Figure 6:
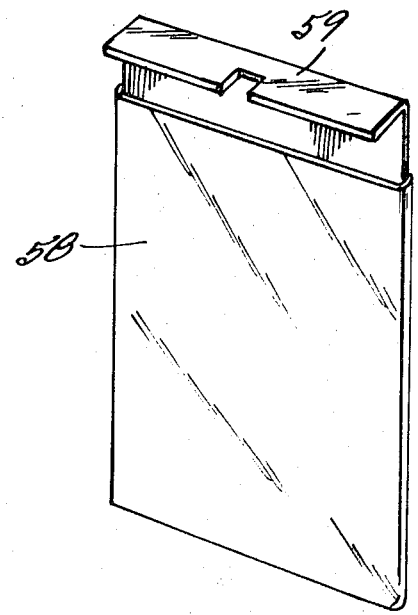
FIG. 6 shows a sleeve or envelope for holding the display cards or panels.

Each of the show cards 28, 30, 32, 34, 36 and 38 has a hook 60, which may be aluminum and bent at an acute angle, attached to its upper part by any type of suitable fasteners. As shown in FIGS. 5 and 6, each of these hooks 60 has a slot 61 located in the bent portion with a width and depth so that, when the lateral position of the moving dog 24 coincides with the location of the slot of the outermost card, the card and hook fall past the dog 24 and window 22 and are temporarily stored on the lifting mechanism 26. In this embodiment, the hooks 60 are prevented from moving with the dog 24 by the abutting of the cards, which they support, against the housing 20. Of course, any alternative and suitable means of constraining the hooks 60 against lateral movement can be alternatively employed.

Instead of attaching the hooks directly to the cards, the cards may simply be slipped into a pocket sleeve or envelope 58 which has a suitable hook 59 permanently attached as shown in FIG. 6. The outer surface of the envelope 50 through which the card is viewed is of course constructed of a transparent material such as Mylar. The hook 59 may be attached by any suitable means.

Slots of adjacent show cards must, of course, be staggered to prevent all of the cards from falling simultaneously whenever the dog 24 aligns with the slot of the outermost card. As shown in the FIGS. 5 and 6, this may be accomplished by offsetting the slots so that alternate slots are aligned. With such an arrangement, the dog or pivot 24 will drop a card as it moves in one direction and as it returns.

As each of the cards falls past the window 22, it is caught and held on a lifting mechanism 26 such as shown in FIG. 4. In this embodiment the mechanism 26 is a light frame member with a central opening through which the cards fall and a bar 63 which catches and holds the hook 61 of the outermost card. Cards falling after the first card are stacked atop the hook 61 of the immediately preceding card so that each card individually falls and is held in position and prevented from downward, but not upward movement, by any suitable means, such as shelf or bar 65 attached to housing 20.

By the time that all of the cards have dropped, the apparatus will be prepared to restore all of them to their initial positions with the hook 61 of the outermost card on mechanism 26 once again hanging from the dog 24 and the other hooks of the other cards stacked atop that hook and the cycle will be simply repeated indefinitely. Thus, without supervision this quiet action display continuously presents its message in an effective and attention getting manner.

When the last card of the program has dropped or been displayed, the pin 62, best seen in FIG. 4, which is attached to the belt or chain 50 catches an extension or hook 64 of the lifting mechanism 26 upon which all of the cards are now stored and carries it upward from the shelf 65, or whatever means prevents the mechanism 26 from falling downward, past the viewing window 22. The pivoted dog 24, which is still moving horizontally, of course pivots outwards toward the window 22 as the cards pass and then swings back underneath the hooks 61 ready to catch them as they fall downward with the lifting mechanism 26 as it returns to its initial position on the shelf 65 below the viewing window 22.

As the pin 62 begins to move with the belt 50 around the guide roll or cam, it also moves laterally with regard to the mechanism 26 which is constrained against such motion by abutment against the housing 20, and moves until it passes the edge of the extension 64 which supports the mechanism 26. The lifting mechanism 26 then falls by gravity until it is stopped by the shelf 65 in its initial position below the window 22. The hook or dog 24 then catches the cards by their hooks 61 with the hook 61 of the outermost card caught on the dog 24 and the remainder of the hooks 61 stacked on the next outermost hook as shown. The dog 24 which has been continuously moving back and forth while the lifting mechanism has been raising the fallen cards begins once again dropping the cards periodically and sequentially as described above while the pin 62 moves around with the belt or chain 50 so that it is once again positioned to lift the mechanism 26 after all of the cards have again fallen.

Figure 7:
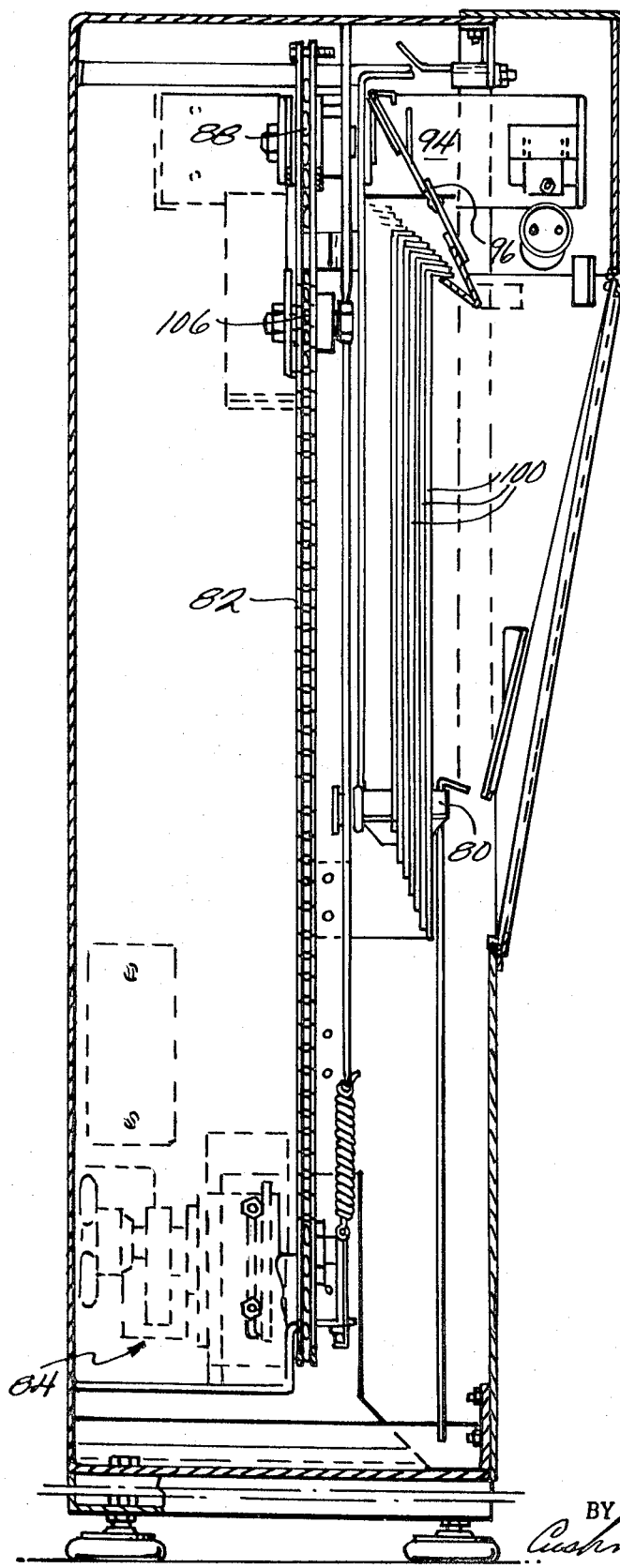
FIG. 7 shows a cut away, side view of another embodiment.
Figure 8:
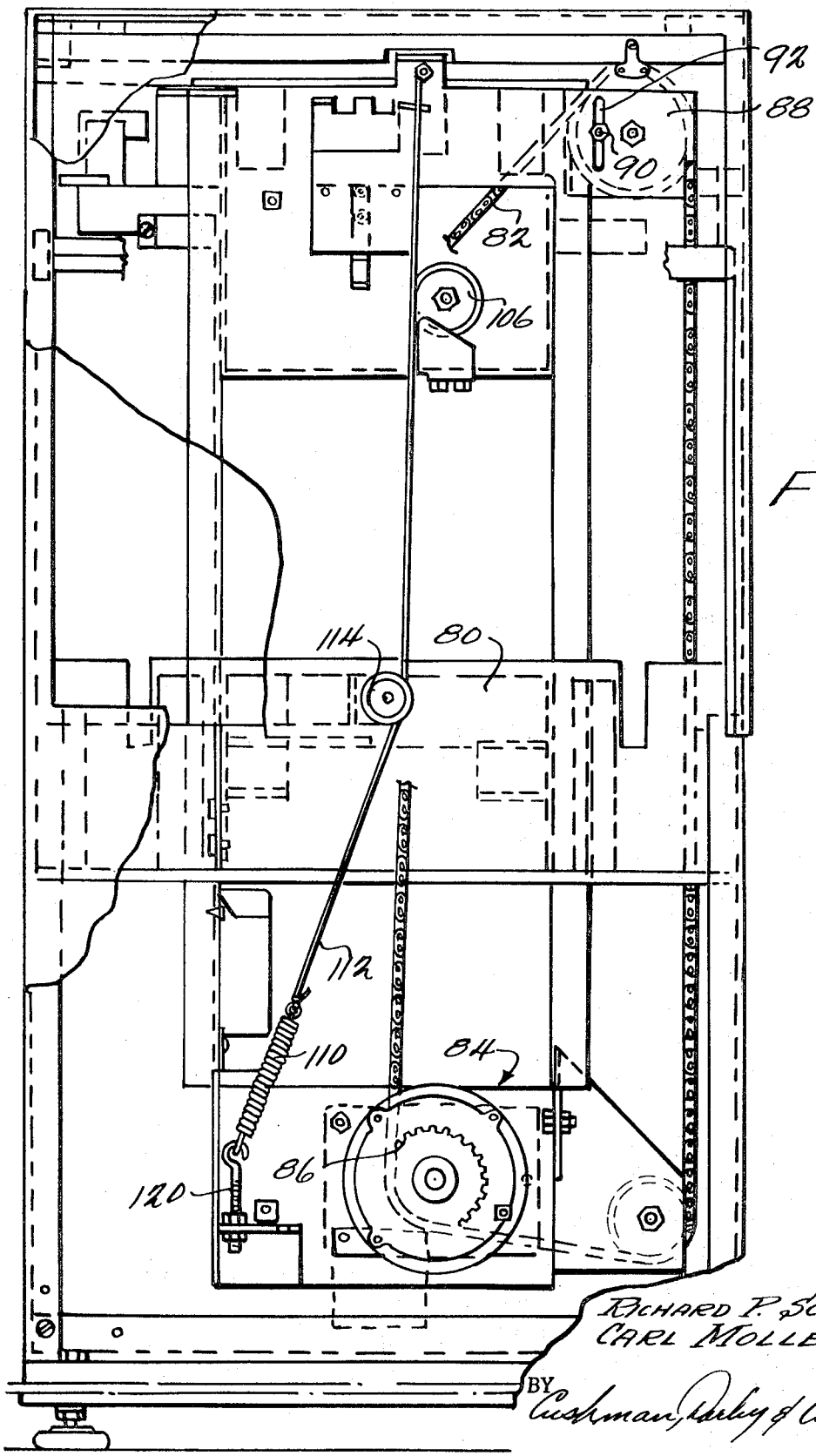
FIG. 8 shows a cut away, front view of the embodiment of FIG. 7.

Reference is now made to FIGS. 7 and 8 which show another embodiment of the invention with an arrangement for braking the lifting mechanism 80. As in the embodiment of FIGS. 1–4, an endless belt 82, which is partially shown removed and which preferably is a sprocket belt or chain, is driven continuously by a motor 84 through a toothed gear 86 or any other suitable means. This belt 82 in turn drives a sprocket wheel 88 having a pin 90 mounted in a slot 92 therein so that the pin 92 rotates with the wheel 88. Further pin 92 is attached to a channel member 94 which is moved laterally back and forth as the pin rotates. A dog or hook 96 hangs from the channel in the manner shown in FIG. 4 and cards 100 having slots such as shown in FIG. 4 hang from the dog 96 and stacked atop the outermost card.

The cards then periodically drop from the dog 96 onto lifting mechanism 80 below window 102 exposing the next outermost card to view. Finally after all the cards 100 or all but the innermost card, have fallen, a pin such as pin 62 in FIG. 4 elevates the lifting mechanism until the cards 100 are above the dog 96. As the pin moves around the wheel 106, it moves out of engagement with the lifting mechanism 80 and, both cards 100 and mechanism 80 fall, the cards to be caught on dog 96 and the mechanism 80 to return to its initial position below window 102.

However, in contrast to mechanism 26 of FIGS. 1–4, the mechanism 80 does not fall freely but is braked and slowed by a braking arrangement comprising a spring 110, a cord 112 and a small wheel 114 mounted on the mechanism 80. The spring 110 is attached at one end to an eye bolt 120 which is attached to the bottom of the device and attached at the other end to one end of the cord 112. The cord 112 is attached at its other end to the top of the device and is curved about the wheel 114 as shown in FIG. 8. Accordingly it should be apparent that the cord 112 exerts an upward force on the wheel 114, and thus the mechanism 80, which varies with the distance of the mechanism 80 from the spring 110. Thus as the mechanism 80 falls downward the cord 112 exerts an increasing upward force on mechanism 80 to slow it as the spring 110 stretches. The mechanism 80 can be completely stopped by this arrangement or simply slowed and then stopped by contact with a peg or shelf in the device. Further the force exerted by the arrangement during the descent of the mechanism 80 can be controlled by altering the length of cord 112 or screwing bolt 120 into or out of the frame.

Figures 9B, 10, 11:
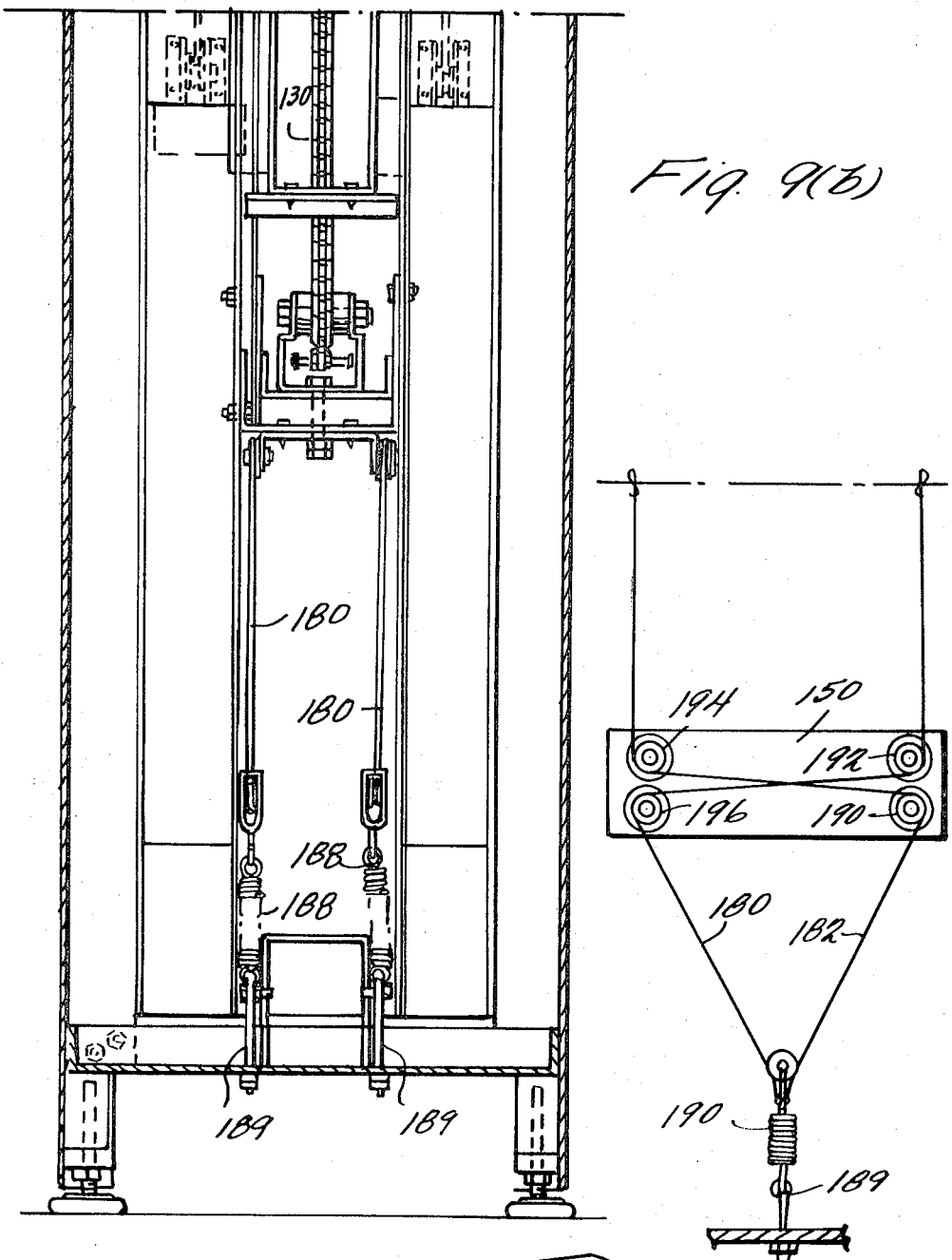

Reference is now made to FIGS. 9a and 9b which show yet another embodiment of the invention whereby two sets of cards are simultaneously presented at two windows 124 and 126 on opposite sides of the device. FIG. 9a shows the upper portion of the device and FIG. 9b the lower. Like the window 22, windows 124 and 126 are mounted at an angle, leaning outward toward the viewer so as to minimize glare and reflection.

As in the embodiments of FIGS. 1–8, the embodiment of FIGS. 9a and 9b is operated by an endless belt or chain 130 which is driven by a conventional motor (not shown). In the same manner as in FIG. 4, a sprocket wheel 132 is rotated by the chain or belt 130. However sprocket wheel 132 causes not one but two channels 134 and 136 having hooks or dogs 138 and 140 respectively suspended therefrom as shown in FIG. 4. Preferably pins are mounted in slots as shown in FIG. 4 to cause the lateral movement of channels 134 and 136. Thus the channels 134 and 136 move together and the slotted cards 100 which are the same as the cards shown in FIG. 4 drop from the hooks or dogs 134 and 136 periodically, but not necessarily together.

The cards drop respectively onto lifting mechanisms 150 and 152 until all have fallen, or all but the innermost has fallen. At this time the pin 156 which is fixed on belt 130 engages extending members 160 and 162 which are attached to mechanisms 150 and 152 respectively and lifts both mechanisms, together with the cards on each, upward past windows 124 and 126. As pin 156 moves around wheel 170 in the manner shown in FIG. 4 the pin 156 disengages from members 160 and 162 and the mechanisms 150 and 152 fall to their initial positions.

However, in this embodiment braking arrangement is also provided to slow the mechanisms 150 and 152 during their descent. The braking arrangement for either mechanism 150 or 152 is illustrated in FIG. 10 and it will be understood that each mechanism 150 and 152 is preferably provided with its own braking arrangement. The arrangement shown in FIG. 10 employs two wires or cords 180 and 182 both attached to one end of a spring 188 and at the other end separately to the frame. The spring 188 is in turn attached to a stud 189 which can be adjusted to control the braking of the mechanisms 150 and 152. Attached to mechanism 150 are four wheels or pulleys 190, 192, 194 and 196 and the two wires 180 and 182 are each strung around the pulleys as shown so that they cross in roughly the middle of the mechanism 150. It will be apparent that these wires will exert an upward force on each of the four pulleys 190, 192, 194 and 196 and that this will increase as the mechanism 150 descends toward the spring 188 and the spring 188 is stretched. This upward force, which increases as the mechanism 150 descends, slows the mechanism 150 eventually comes to a stop unless a shelf or support is provided to halt the mechanism and support it while the cards are being dropped onto it.

The embodiment shown in FIGS. 9a and 9b, it is contemplated, will be a large floor model with large cards, for example of the order of 18" x 14". With such large cards a single dog may not be sufficient to hold the cards without wobbling and two or more dogs such as dogs 200 and 202 in FIG. 11 may be used with cards having two slots. The dogs 200 and 202 may be considerably separated or designed to be quite close as desired.

It is obvious that if the apparatus of the above embodiment is to work properly and continue to repeat the program indefinitely that after a complete program the pin 62 must return to the same position at the end of the cycle as it occupied in the beginning. This requires that the belt or chain 50 must make not more than one complete rotation for one program. If the sprocket chain or similar device is used for the belt 50, then the length of the chain expressed in pitches of the sprocket wheel 42 must be some multiple of the number of teeth on that wheel. If a smooth belt is employed then the length of the belt is an integral multiple of the circumference of the wheel 42.

It is also apparent that for any given length of chain, diameter or number of teeth of or on the sprocket wheel 42 that a maximum number of cards in any program is established. Of course, the apparatus will operate with any lesser number of cards with a corresponding time interval equal to the time necessary to display the number of cards equal to the difference between the actual number displayed and the maximum that could be displayed elapsing between the end of one cycle and the initiation of another. It is, of course, possible to adapt any given device for any integral number of cards which is equal to some integral fraction of the maximum number, for example ½ or ⅓, by adding an additional peg or pegs similar to peg 62 in the appropriate places on the belt 50.

This unique device is then capable of continuously presenting a message which is both continuously illuminated and moving so as to inevitably draw the attention of the viewer to it. Moreover, the display is simple and portable and can be placed near any goods or services being offered. Further, the device constructively absorbs waiting time and reduces time-loss-irritation wherever people queue up or must wait such as in a lobby or waiting room. The device can also be used by charitable groups to present public service messages or to rent in donated locations as a quick and effective fund raiser. In short a message is of no value unless it can be communicated; this unique device with its attention grabbing appeal insures that the message is not only properly and continuously presented, but communicated.

Although this embodiment displays each of the cards or panels for the same amount of time, the interval during which any given poster is displayed can be altered by changing the horizontal location of any slot and hook which is attached to it in a lateral direction. Many changes and modifications of the above example of the invention are possible without departing from the spirit of the invention. Accordingly, the scope of the invention is intended to be limited only by the scope of the appended claims.

What is claimed is:

1. Apparatus for sequentially displaying each of a plurality of panels comprising:
   means for suspending said panels so that one of said panels is displayed in a viewing position and for dropping said displayed panel below said viewing position at certain time intervals to display another of said panels in said viewing position so that each of said panels is sequentially displayed,
   means below said suspending means for catching each dropped panel,
   means for raising said dropped panels from said catching means to said suspending and dropping means after all of said panels have been displayed, and
   means connected to said suspending and dropping means and to said raising means and adapted to move continuously at a given rate for causing said suspending and dropping means to drop said panels and said raising means to raise said panels, said causing means including a belt adapted to rotate and a motor for rotating said belt.

2. Apparatus as in claim 1 wherein said raising means includes a pin attached to said belt for elevating said catching means and said panels held by said catching means until said catching means drops to its initial position and said panels are suspended from said suspending means.

3. Apparatus as in claim 2 including means for braking said catching means while said catching means is falling to its initial position.

4. Apparatus as in claim 3 including frame means and wherein said braking means includes at least a single cord means, fixedly attached at one end to said frame means, spring means attached at one end to the other end of said cord means, and attached at the other end to said frame means at least a single wheel means attached to said catching means and disposed so that said cord means engages said wheel means so that said cord means exerts an upward force on said wheel means and said catching means, said upward force increasing as said catching means descends to said initial position, and said spring stretches, to brake said catching means.

5. Apparatus as in claim 4 including means to adjust the rate of said braking.

6. Apparatus as in claim 5 wherein said adjusting means includes at least four said wheel means and two said cord means.

7. Apparatus as in claim 4 wherein said braking means includes at least four said wheels means and two said cords means.

8. Apparatus as in claim 2 wherein said catching means has a protruding tab of a given width engageable with said pin to elevate said catching pin and disengageable with said pin to allow said catching means to drop.

9. Apparatus for sequentially displaying each of a plurality of panels each including an upper supporting portion bent downward in an acute angle to form a hook with a slot of a given width therein, comprising:
   means for suspending said panels stacked one atop the other so that one of said panels is displayed in a viewing position and for dropping said displayed panel below said viewing position at certain time intervals to display another of said panels in said viewing position so that each of said panels is sequentially displayed including a supporting member engageable with the supporting portion of the bottom panel of the stacked panels to support said stacked panels and movable with respect to said supporting portion so that at certain intervals said supporting member moves into alignment with said slot and causes said bottom panel to drop, means below said suspending means for catching each dropped panel, means for raising said dropped panels from said catching means to said suspending and dropping means after all of said panels have been displayed, and means connected to said suspending and dropping means and to said raising means and adapted to move continuously at a given rate for causing said suspending and dropping means to drop said panels and said raising means to raise said panels.

10. Apparatus as in claim 9 including a plurality of said supporting members.

11. Apparatus as in claim 9 wherein the slots of adjacent panels of said stacked panels are not in alignment.

12. Apparatus as in claim 11 wherein said suspending and dropping means includes a wheel engageable for rotation with said belt, a pin attached to said wheel at a given radius and a channel member having a vertical slot within which is disposed said pin so that, as said pin rotates, said channel moves horizontally, said supporting means being attached to said channel so that said supporting means moves horizontally with said channel.

13. Apparatus as in claim 12 wherein the length of said belt is not less than the length required so that all of said panels drop before said belt makes a complete revolution.

14. Apparatus as in claim 13 wherein said belt is a sprocket belt and said wheel has a given number of teeth and the length of said belt expressed in pitches of said sprocket wheel is an integral multiple of said given number.

15. Apparatus as in claim 9 including a housing containing said suspending means, said catching means, said raising means and said causing means and having a window through which the panel in said viewing position can be viewed, said window being at an angle to the vertical so that glare and reflections are substantially eliminated.

16. Apparatus as in claim 15 wherein said window leans outward toward the viewer.

17. Apparatus as in claim 9 wherein said apparatus sequentially and at the same time displays a first and second set of said panels in a first and second viewing position respectively, said suspending means suspends said first viewing position and said catching means catches said first set of panels and including a second means for suspending said panels so that one of said panels of said second set is displayed in said second viewing position and for dropping said displayed panel below said viewing position at certain time intervals to display another of said panels in said viewing position so that each of said panels in said second set is sequentially displayed and a second means below said second suspending means for catching each dropped panel of said second set.

18. Apparatus as in claim 9 including sleeve means for holding said panels, having a transparent surface for displaying said panels and means for engaging said suspending means to suspend said panels.

19. Apparatus as in claim 18 wherein said engaging means is an upper supporting portion bent downward to form a hook with a slot of a given width therein.

References Cited

UNITED STATES PATENTS

| 458,475 | 8/1891 | MacKenzie | 40—103X |
| 692,923 | 2/1902 | Shepard | 40—97 |
| 1,073,347 | 9/1913 | Von Heissig | 40—103 |
| 1,354,245 | 9/1920 | Dulgeroff | 40—36 |

FOREIGN PATENTS

| 57,134 | 1/1913 | Austria | 40—103 |
| 621,014 | 1/1927 | France | 40—36 |
| 301,827 | 10/1932 | Italy | 40—36 |

LAWRENCE CHARLES, Primary Examiner

U.S. Cl. X.R.

40—36